(12) United States Patent
Dachere

(10) Patent No.: US 11,734,120 B2
(45) Date of Patent: Aug. 22, 2023

(54) TIME-DIFFERENTIAL USER INTERFACE FOR DATACENTER MANAGEMENT

(71) Applicant: VMware, Inc., Palo Alto, CA (US)

(72) Inventor: Vaijayanti R. Dachere, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 1101 days.

(21) Appl. No.: 14/986,634

(22) Filed: Jan. 1, 2016

(65) Prior Publication Data

US 2017/0192850 A1 Jul. 6, 2017

(51) Int. Cl.
*G06F 11/14* (2006.01)

(52) U.S. Cl.
CPC ...... *G06F 11/1451* (2013.01); *G06F 2201/84* (2013.01)

(58) Field of Classification Search
CPC .. G06F 11/1451; G06F 2201/84; G06F 17/30; G06F 16/00; G06F 12/201
USPC ........................................................ 707/649
See application file for complete search history.

(56) References Cited

U.S. PATENT DOCUMENTS

| | | | |
|---|---|---|---|
| 2014/0018106 A1* | 6/2014 | Pawar et al. ............ | G06F 17/30 707/654 |
| 2014/0181046 A1* | 6/2014 | Pawar ..................... | G06F 16/27 707/654 |
| 2016/0062853 A1* | 3/2016 | Sugabrahmam ...... | G06F 3/0647 714/4.11 |

\* cited by examiner

*Primary Examiner* — Hosain T Alam
*Assistant Examiner* — Tracy M McGhee

(57) ABSTRACT

A user interface (UI) uses overlays to tag representations of datacenter components with indications of changes that have occurred over a selected time interval. Log files, problem and service reports, and knowledge base items are gathered at various times to generate datacenter snapshots. A pair of snapshots can be compared to detect configuration changes, reported problems and their dispositions, and knowledge-base items introduced during the selected time interval. Trouble-shooting problems can be facilitated by using the interface to find changes that may have led to problems or that may cause problems in the future.

21 Claims, 4 Drawing Sheets

TIME-DIFFERENTIAL USER INTERFACE FOR DATACENTER MANAGEMENT

BACKGROUND

"Datacenter", as the term is used broadly herein, is a computer-system installation that provides storage for and remote access to data. A typical datacenter can include facilities, large numbers of computers, storage devices, network devices, computer media, peripherals, firmware instances, operating-system instances, application software instances, management software and so on. When something goes wrong, e.g., a server (a computer providing a service to other computers) fails to respond to an inquiry, there can be many possible causes. For example, the server may have suffered a hardware failure or a software fault, or a network failure may have prevented the server from receiving a request or have prevented the server's response from being returned. For each of these possibilities, there can be many causes, e.g., the hardware failure can be a processor failure, a memory failure, a network-card failure, etc. A software fault may be caused, for example, by a design defect, data corruption, incompatibility with other software or hardware, etc.

Accordingly, troubleshooting datacenters can be a daunting task. For example, trouble-shooting can involve characterizing the datacenter's configuration, identifying, e.g., using log files, recent changes that may have caused a problem, and running tests to determine which of the identified possibilities might have actually caused the problem. The time and effort involved in troubleshooting can be a burden to a datacenter customer, especially if there is some downtime involved. What is needed is an approach that reduces the costs and other burdens associated with trouble-shooting and otherwise managing datacenters.

DETAILED DESCRIPTION

When a problem is detected, trouble-shooters typically want to know what changes occurred shortly before the problem was detected, what related problems may have occurred, whether others experienced a similar problem, and if there are any known solutions to the detected problems. The present invention provides a user interface that provides such information in a visual and readily accessible manner. This translates into more rapid troubleshooting and problem resolution, which in turn can reduce costs, increase productivity, profitability, and customer satisfaction.

Figure 1:
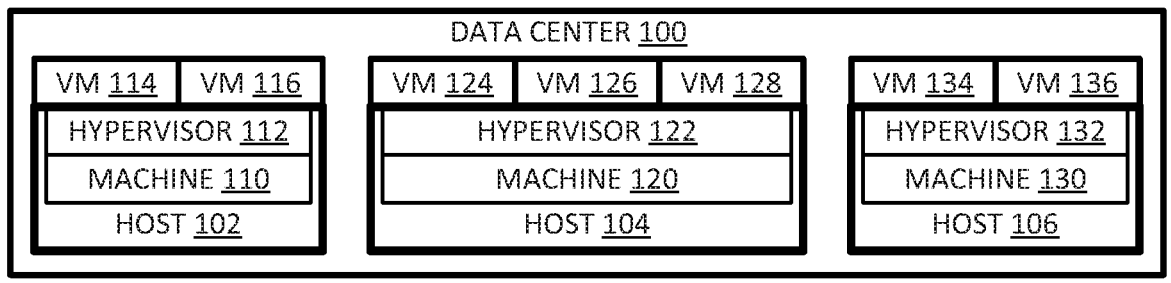
FIG. 1 is a schematic diagram of a computer system to be managed in accordance with the invention.

FIG. 1 represents a datacenter 100, to which the present invention can be applied. Datacenter 100 includes virtual-machine hosts 102, 104, and 106. Host 102 includes a host machine 110 and a hypervisor 112. Virtual machines (VMs) 114 and 116 run on host 102. Host 104 includes a host machine 120 and a hypervisor 122. VMs 124, 126, and 128 run on host 104. Host 106 includes a host machine 130 and a hypervisor 132. VMs 134 and 136 run on host 130.

Datacenter 100 is relatively small for expository purposes. The present invention can be applied to systems with smaller and greater numbers of hosts and virtual machines. Different types of hypervisors and virtual-machine monitors can be accommodated. Datacenter 100 is organized as a three-level hierarchy (datacenter, hosts, virtual machines), while the present invention can also be applied to hierarchies with lesser or greater numbers of hierarchical levels.

Figure 2:
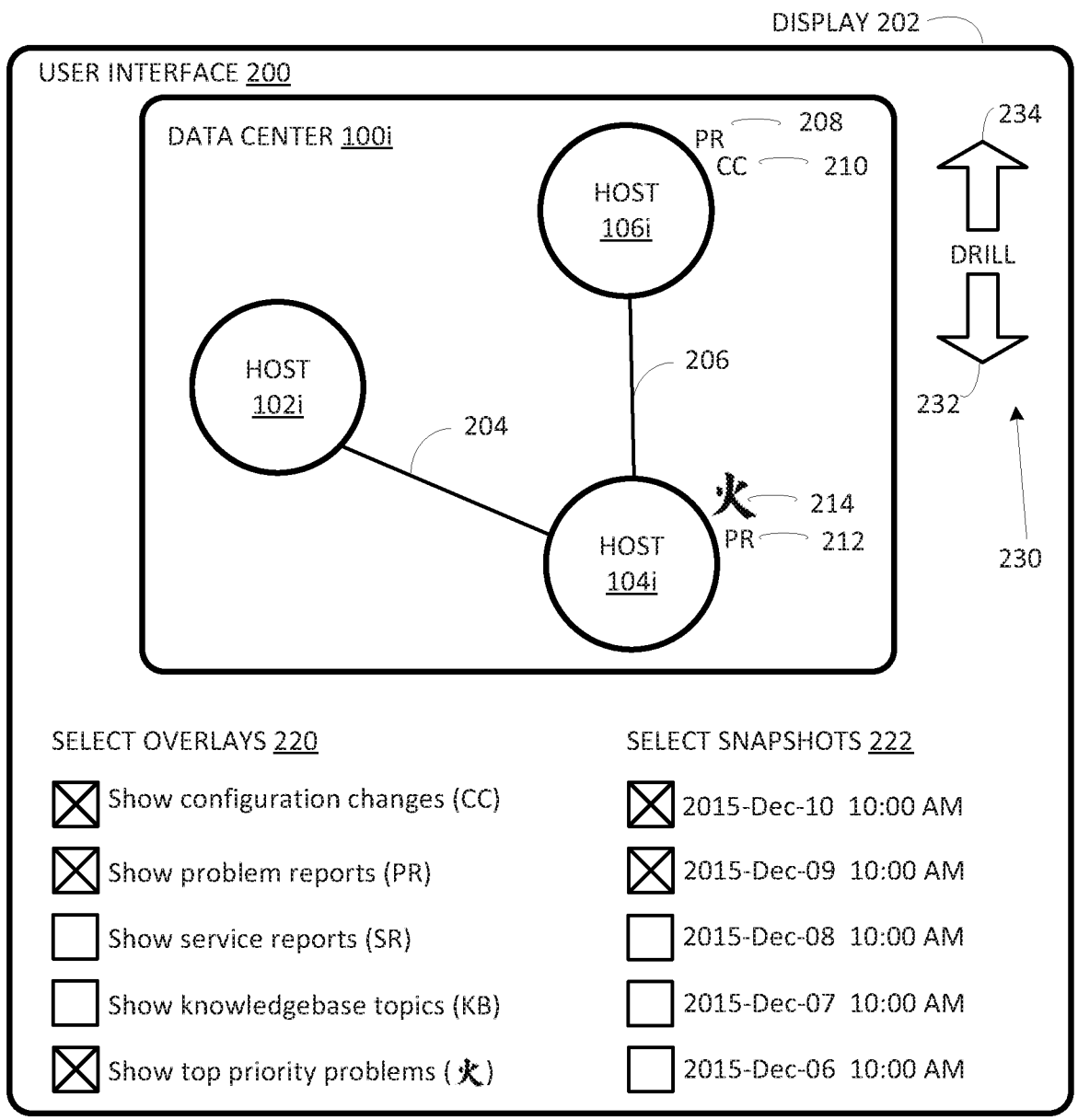
FIG. 2 is a time-differential topological view of the computer system of FIG. 1 showing changes in configuration and problem reports issued during a selected time interval.

To facilitate trouble-shooting and other management of datacenter 100, the present invention provides a user interface (UI) 200, represented at a particular time in FIG. 2. User interface 200 can be presented on a display 202. User interface 200 provides a datacenter image 100i, which is a topological representation of datacenter 100. In other embodiments, representations other than topological may be used.

Datacenter image 100i includes host images 102i, 104i, and 106i, respectively representing hosts 102, 104, and 106. Datacenter image 100i includes connection lines 204 and 206, which represent network connections among hosts 102, 104, and 106. UI 200 also provides for various tags to be displayed in visual association with image elements for the datacenter image.

For example, host image 106i is tagged with a "PR" sign 208 indicating that a problem report has been issued with respect to host 106. A problem report is a report of a problem typically issued by a customer of a datacenter. Host image 106i is tagged with a "CC" sign 210 indicating a configuration change has been applied to host 106. Host image 104i is tagged with a PR sign 212, indicating a problem report has been issued with respect to host 104. Host image 104i is tagged with a top-priority (fire) sign 214 "火" (Chinese character for fire). Of course, other signs can be used for the overlays. UI 200, as shown in FIG. 2, might, for example, suggest that a top-priority problem associated with host 104 may have been caused by a configuration change of host 106. Of course, other possibilities may be inferred as well.

Signs 208, 210, 212, and 214 are rendered based on overlay data objects, which are separate from a topological data object used to render the topological datacenter image 100i. Each overlay data object provides the data for rendering all image objects of a given type. For example, PR signs 208 and 212 belong to the same overlay data object. While, CC sign 210 belongs to an overlay object that is separate from the overlay object used to generate the PR signs.

UI 200 provides an overlay selection list 220, which specifies a "configuration changes" overlay, a "problem reports" overlay, a "service reports" overlay, a "knowledge base" overlay, and a "top-priority" overlay. Each listed overlay includes a respective check box that, when checked, indicates the respective overlay is active so that any signs that it bears are displayed in conjunction with datacenter image 100i. With the check boxes as shown in FIG. 2, the configuration change, problem reports, and top-priority overlays are active so that the PR, CC, and "火" signs are displayed. In FIG. 2, the service-reports and the knowledge base overlays are not checked, so their respective signs are not displayed in association with datacenter image 100i at the time represented in FIG. 2. The signs displayed can be changed by checking and unchecking the respective check boxes, e.g., using a mouse or other cursor controller. Zero, some, or all of the overlays can be active at the same time.

A "configuration-change" overlay is used to identify nodes for which a configuration change has occurred during a selected time interval. A "problem-report" overlay is used to provide image tags that indicate problem reports have been issued for respective nodes represented in datacenter image 100i. A "service-report" overlay indicates dispositions (e.g., whether or not a problem has been solved in response to a problem report) for respective nodes. A "knowledgebase" overlay indicates nodes that exhibit characteristics of a problem that appeared in the present or another datacenter and for which a solution may have been found. A "top-priority" overlay identifies nodes with problems requiring immediate attention. Other embodiments may include overlays for other conditions and/or not include one or more of the ones listed in FIG. 2.

Most of the overlays represent data describing changes that occurred within a specific time range. At the data level, the changes are identified by comparing "snapshots" of datacenter 100 taken at different times. Herein, a "snapshot" is a description of a datacenter as it exists at a specified time, typically, but not necessarily, the time at which the snapshot data was collected. UI 200 includes a snapshot list 222 which lists snapshots according to the times represented by the snapshots. A user can select snapshots to be compared by checking and unchecking respective checkboxes. To define a time range, two snapshots are checked at any given time. By default, the most recent two snapshots are checked. For the time range represented in FIG. 1, for example, one configuration change occurred and two problem reports were issued between 2015 Dec. 9 10 am and 2015 Dec. 10 10 am.

Figure 3:
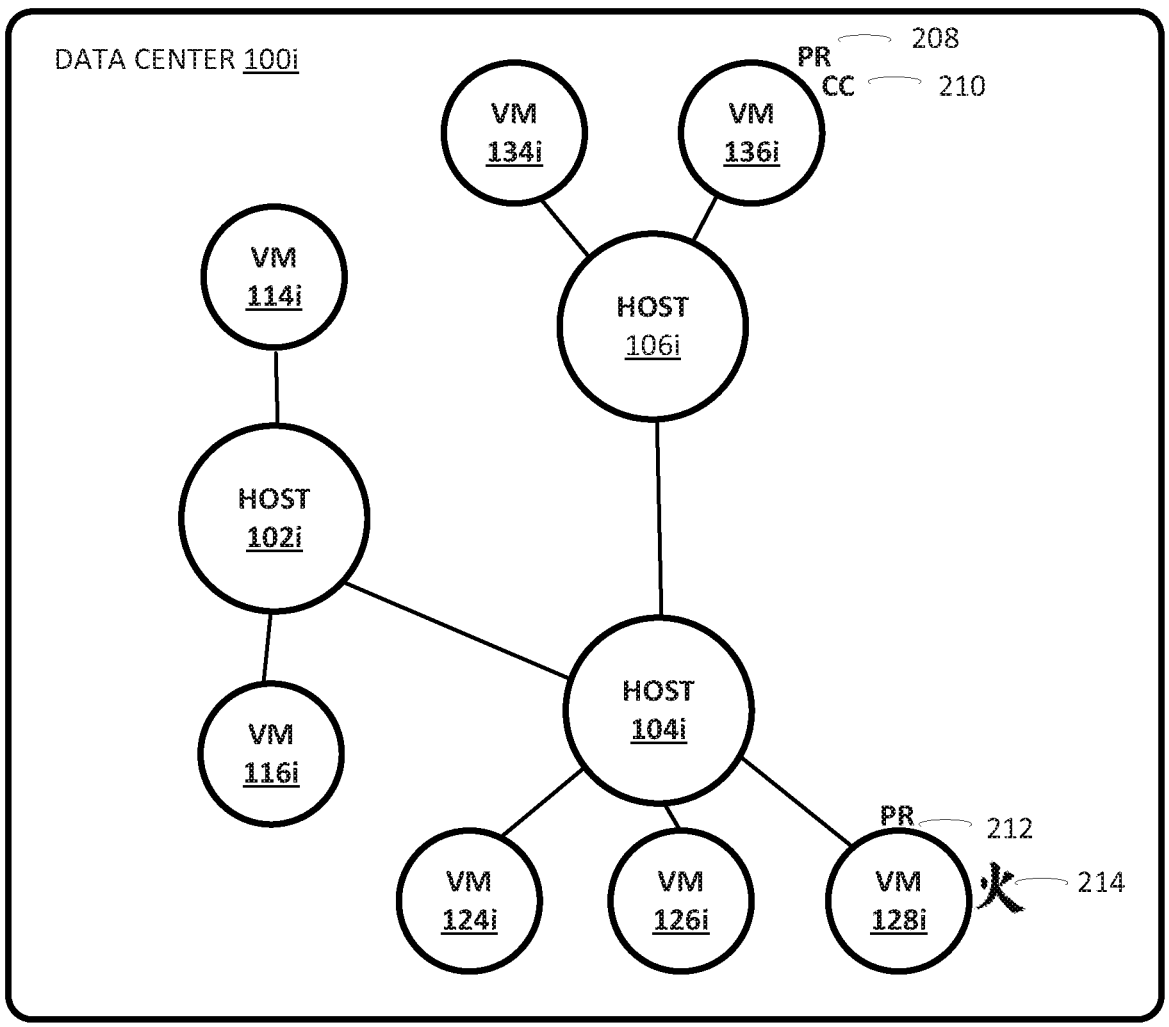
FIG. 3 is a detailed bottom-level time-differential topological view of the computer system of FIG. 1.
Figure 4:
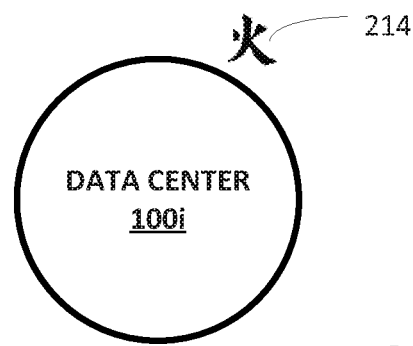
FIG. 4 is a top-level time-differential topological view of the computer system of FIG. 1.

UI 200 provides a level control 230 for drilling down and for drilling up datacenter image 100i to provide more or less detail. Drilling down can be achieved by clicking on down arrow 232 and drilling up can be achieved by clicking on up arrow 234. From the condition of datacenter image 100i in FIG. 1, drilling down can result in the view of image 100i in FIG. 3, wherein VM images 114i, 116i, 124i, 126i, 128i, 134i, and 136i, representing respective VMs, are shown in relations to their respective hosts. Notice that signs 208, 210, 212, and 214 are associated with respective VMs in FIG. 3, thus more precisely defining the situs of respective events. Drilling up from the condition in FIG. 2 yields the datacenter image 100i with the hosts it contains hidden, as shown in FIG. 4.

While datacenter image 100i provides for three hierarchical levels of representation (as shown in respective FIGS. 2-4), other scenarios can provide for more or viewer hierarchical level of representation. For example, the datacenter may belong to a group of datacenters; in that case another level will be added at the top. For another example, the VMs can include containers, adding another level at the bottom. For a third example, in some datacenters, hosts are arranged in clusters; in that case, there can be four levels, a root datacenter level, a cluster level, a host level, and a VM level. In these three examples, the datacenter images can provide four or more levels of representation.

Overlays are designed such that the associated tags can appear at different hierarchical levels. For the top-priority overlay, the top-priority (火) tag 214 appears at all three hierarchical levels: top (FIG. 4), intermediate (FIG. 2) and bottom (FIG. 3). In this case, the component with which the top-priority (火) tag 214 changes as the lower hierarchical levels allow greater specificity. The greater specificity also applies to the other (e.g., PR and KB) tags; a difference being the latter two are not shown at the top level (FIG. 4), although their presence is represented generically by the top-priority (火) tag 214 of FIG. 4.

Depending on the embodiment, the overlay may be designed so that its tags appear the same wherever they appear, an overlay may call for tags being modified. For example, tags may appear with unique identifiers (e.g., serial numbers) at one level and without unique identifiers at another level. In various embodiments hovering and/or clicking a tag can expose more detailed identifications and explanations of what the signs represent. Initially hiding the details reduces clutter on the user interface, making it easier for a user to clearly and quickly identify what the major issues are in a given datacenter. This, in turn, enables the user to narrow down their focus when triaging a problem.

Figure 5:
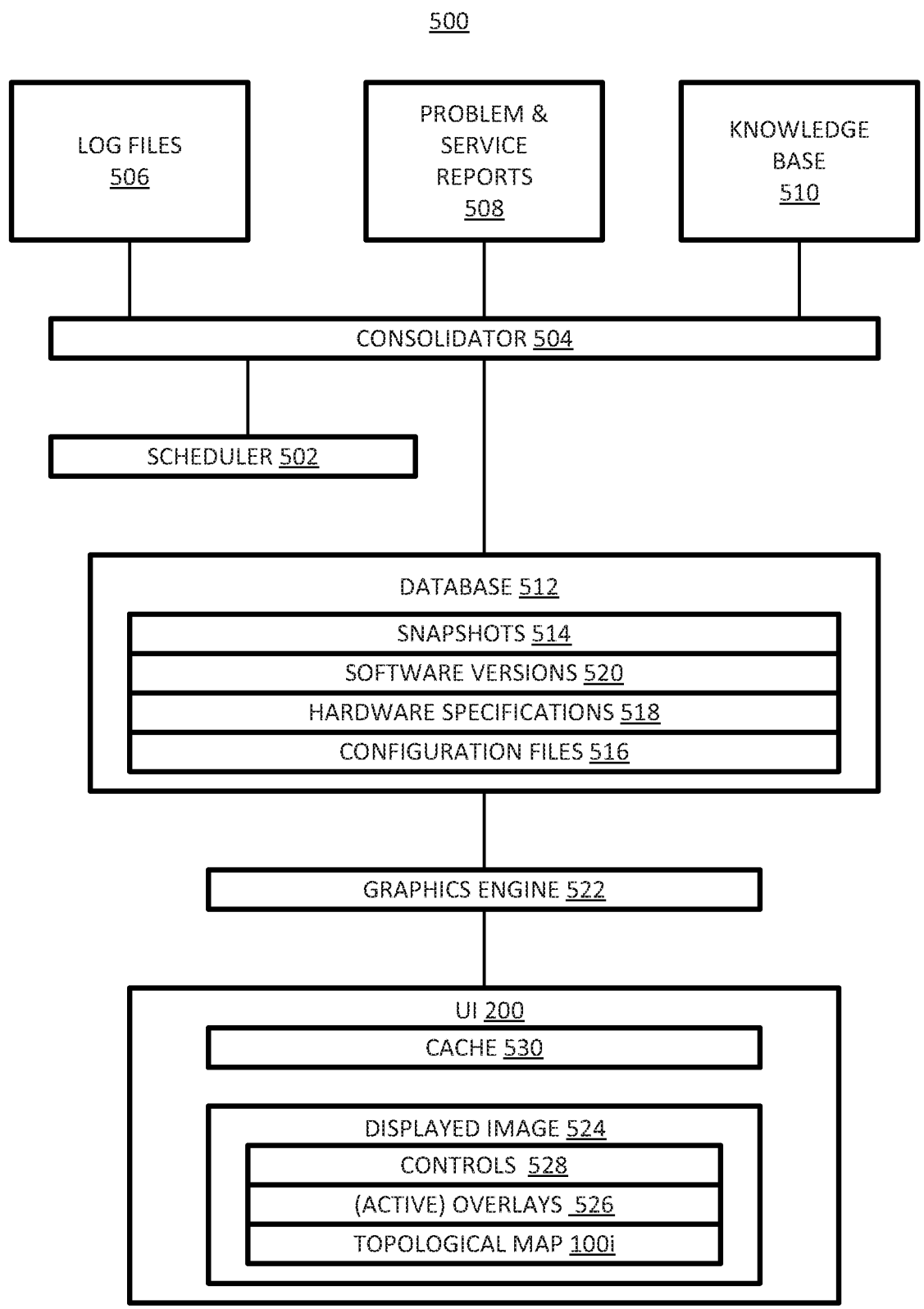
FIG. 5 is a block diagram of a system for providing the time-differential topological views of FIGS. 2-4.

A UI system 500 is represented in FIG. 5. UI system 500 includes a scheduler 502 for scheduling the generation of snapshots. Scheduler 502 can schedule snapshots: periodically; at specified future times; for immediate generation in response to a command; in response to detection of an event meeting a predetermined condition; or according to any other specified program. When a snapshot is to be generated, scheduler 502 directs a consolidator 504 to generate a snapshot. In response, consolidator 504 accesses various sources to obtain the data required to build a snapshot.

Consolidator 504 can retrieve log files 506 from various resources within datacenter 100. These can include logs of configuration changes, error logs, usage data, e.g., from computing nodes, storage devices, network devices, and software entities. Problem and service reports 508 can be gathered. A problem report is a report of a problem, e.g., from a customer of the datacenter to a customer service for the datacenter. A service report is a report on the disposition of a reported problem; the disposition may include a solution for a problem.

Consolidator 504 can also gather knowledge-base items. These can be documents describing problems and solutions that may have occurred with respect to other customers or datacenters. Some items may be retrieved from a local deposit repository associated with the datacenter. Other items may be retrieved from external sources, e.g., from manufacturer's websites and user forums. Instead of actually gathering the documents, the consolidator can simply acquire pointers to the relevant knowledgebase items.

Consolidator 504 consolidates and organizes the gathered data and documents and consolidates them into a time-stamped snapshot of a database 512. Some of the data, e.g., reports and knowledgebase items, for a snapshot may be found in the database itself. In addition, database 512 can include configuration files 516 for datacenter components, hardware specifications 518 for datacenter hardware, and software version identifiers 520 for datacenter software and firmware.

A graphic engine 522, e.g., a Python engine, interacts with UI 200 to determine the settings selected by a user, including active overlays, selected snapshots, and drill-down levels. Based on these settings the graphics engine generates an image 524 to be displayed. This image 524 includes the topological map 100i, the active overlays 526, and control settings 528, e.g., drill-down level and snapshot selections. Note that UI 200 can also include a cache 530 to aid performance; the cache can store recently or frequently used UI images so that a user can redisplay images without the images having to be regenerated by graphics engine 522. Such a performance enhancement can be important where a large number of nodes would otherwise require long latencies for rendering nodes and overlays. [RD] The cache can be used to store most frequently used overlay tags (such as the fire symbol, KB, PR, etc.); most frequently viewed topology (such as intermediate level nodes or bottom level nodes), most frequently used datacenter (given a list of datacenters for a given customer. The customer can view their datacenters on a geographical graph and if they frequently access the USA west coast datacenters more frequently than other datacenters around the world, then all associated node information could be cached in a multi-tier cache. Additionally, each geographical location for datacenters could have its own multi-tier cache (ex. USA-west, USA-east, Canada-West, Canada-East, Europe-West, Europe-East etc.). The multi-tier cache (primary, secondary, tertiary, quaternary) would function such that an entire datacenter "view", i.e., all topology-levels would be cached in the primary cache, all snapshot differences would be stored in the secondary cache, all overlay-related information would be cached in the tertiary cache, all related/associated issues surmised from the overlay information would be in the quaternary cache (presumably, this would be the least-frequently accessed). However, the caching strategy may be configurable by the user/administrator depending on their usage/needs of the system.

Figure 6:
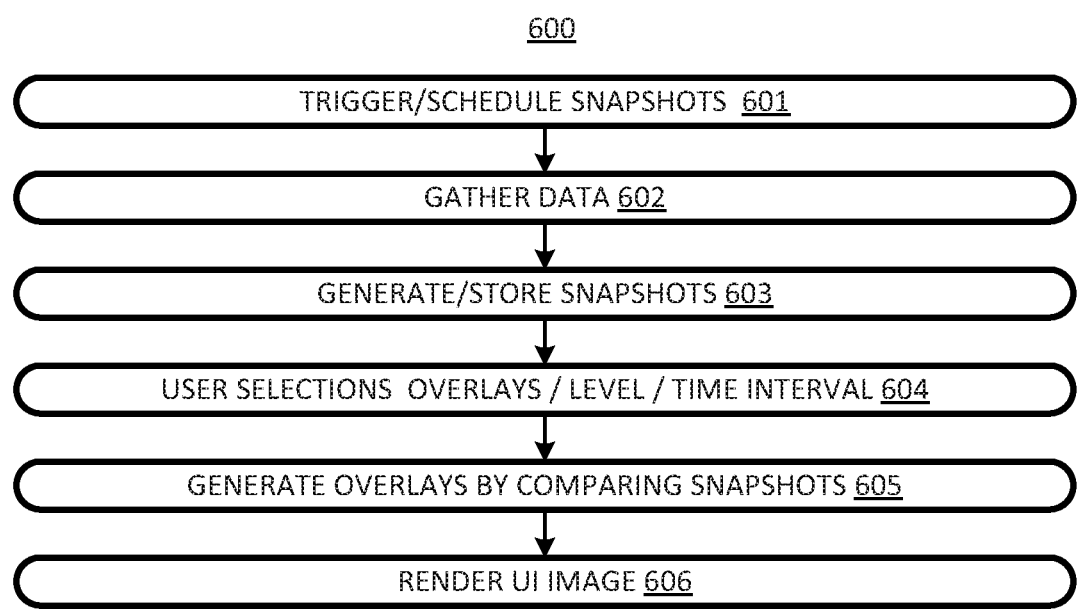
FIG. 6 is a flow chart of a process for providing the time-differential topological views of FIGS. 2-4.

UI system 500 implements a user-interface process 600, also implementable by other systems, as flow charted in FIG. 6. At 601, snapshot generation is scheduled. The scheduling can be periodic, immediate in response to a trigger, based on a detection of a condition, otherwise programmed, or a combination of the above.

Each snapshot calls for gathering data descriptive of the target datacenter and related events. For each snapshot, the data can be gathered at the respective time at 602. The gathered data includes a respective snapshot time for each snapshot. A snapshot time is the time for which the corresponding snapshot is descriptive of the target system. In many cases, the snapshot time is, at least approximately, the time at which the snapshot data was collected. Alternatively, a snapshot may be reconstructed from previously collected and time-stamped data. In such cases, the snapshot time can be considerably earlier than the collection time for the snapshot. At 603, snapshots are generated (using the gathered data) and stored in a snapshot database.

At 604, a user interacts with a user interface to select at least one of: a hierarchical level for a datacenter; which overlays are to be active and which are to be inactive; and the snapshots to be compared to populate the overlays. At 605, the selected snapshots are compared to yield the overlays. At 606, the selected UI image is rendered, showing a topological or other view of the target datacenter tagged according to the selected overlays for the time interval extending between the snapshot times for the selected snapshots.

The present invention provides a user interface that associates managed nodes of a datacenter with changes applicable to trouble-shooting and other management activities regarding the datacenter. Exemplary nodes can include, by way of explanation and not of limitation, servers, storage devices, network interfaces, networks, switches and other network infrastructure devices, peripherals, virtual machines, operating systems, and applications programs. Exemplary changes can include, by way of explanation and not of limitation, a fault detection, a configuration change, the submission of a problem report, the implementation of a solution, and the publication of a knowledge-base item, e.g., predicting a fault.

A user may have considerable control over the user interface. For example, the user may select among time-differential parameters to be displayed. For example, the user may request that problem reports be displayed and for configuration changes not to be displayed. In addition, the user can select the beginning and end times for intervals over which changes must occur to be represented in the display. For example, the changes may be indicated for the time interval between the penultimate system snapshot and the most-recent system snapshot. Alternatively, the user can select any two earlier snapshots to be compared.

Herein, a "snapshot" of a datacenter is a description of the state of the datacenter at a particular time. A snapshot may be taken at the time represented by the snapshot, or can be reconstructed for a past time, e.g., based on logs of configuration changes, problems, solutions, etc. Thus, a time-differential rendering may be based on pre-existing snapshots or snapshots reconstructed in response to a command to generate the time-differential display.

The base representation of the datacenter can be topological, with representation of nodes connected by representations of their connections. A topological representation facilitates recognition of the relationships between nodes. Thus, for example, a communication problem might be due to one node, a node to which it is connected, or to a connection between the nodes. Recognizing these possibilities is likely to be easier with a topological view, e.g., as opposed to a tabular view with a list of components.

The illustrated embodiment provides for "drilling" down and up views of different hierarchical levels of a hierarchical datacenter. Generally, a computer system includes at least two hierarchical levels. A single element can represent the system as a whole, while a graph of nodes and their connections can represent a second level. In general, one can drill down a node (other than a bottom-level nodes) to view its components and their connections.

The user interface can be configured in a variety of ways that affect how overlays are presented as different hierarchical levels are displayed. Tags can include graphic elements and text. In the illustrated embodiment, the overlays provide tags in the form of icons. Clicking on a tag provides a detailed explanation for the tag. In alternative embodiments, hovering over a tag can provide explanatory text. For example, a representation of a server may be tagged with an icon indicating that a problem report was issued regarding the server. Clicking on the icon directs the user to a textual description of the problem. These and other modifications to and variations upon the illustrated embodiment are provided by the invention, the scope of which is defined by the following claims.

What is claimed is:

1. A process comprising: gathering data for generating snapshots; capturing snapshots of a target datacenter, each snapshot representing a state of the target datacenter at a respective time, the target datacenter including datacenter components, each snapshot including values of respective parameters of respective datacenter components; comparing snapshots to identify changes in the values occurring between the respective times of the snapshots; and generating a datacenter representation of the target datacenter, the datacenter representation including, component representations of the datacenter components, and tags in visual association with respective component representations, each tag indicating a change that occurred between the snapshots being compared to a respective value of a respective parameter for the component represented by the component representation in visual association with the tag, wherein said tags appear the same on each of said respective component representations, said tags appearing with unique identifiers at each of said respective component representations, said tags further providing additional identification and explanation of what said tags represent when a user utilizes a user interface to interact with said tags, said datacenter representation including a three-level hierarchy topological representation including a representation of nodes and representations of corresponding node connections, said three-level hierarchy topological representation facilitating recognition by said user of relationships between said nodes, said tags rendered based on overlay data objects which are separate from said three-level hierarchy topological representation topological data object used to render the topological datacenter image, said overlay data objects providing data for rendering all image objects of a given type, said overlay data objects appearing at different hierarchical levels, said tags configured such that said tags represent data describing changes that occurred within a specific time range, said tags having unique identifiers at a first level, said tags not having unique identifiers at a second level, each of said overlay data objects includes a respective check box that, when checked, indicates that a corresponding one of said overlay data objects is active, said overlay data objects including a top-priority overlay which identifies said nodes with problems requiring immediate attention, wherein the identified differences are assigned to plural difference categories, the process further including changing which categories of identified differences are displayed based on user interactions with difference-category user-interface elements.

2. The process of claim 1 wherein the parameters belong to respective parameter classes, and each of the tags indicates a change that occurred to a respective value of a respective parameter belonging to a parameter class in a first set of parameter classes specified by a user.

3. The process of claim 2 wherein the parameters include configuration problem reports or service reports.

4. The process of claim 2 wherein the parameters include knowledge-base items relating to datacenters other than the target datacenter.

5. The process of claim 2 further comprising responding to interaction with a hierarchical-level control to change the hierarchical level of a representation of the datacenter.

6. The process of claim 2 further comprising responding to an interaction with a control to select which parameter classes are specified by the user.

7. The process of claim 2 further comprising interacting with a snapshot control for selecting which snapshots are to be used to generate the overlays.

8. A system comprising non-transitory media encoded with code that, when executed by hardware, causes the hardware to implement a process including: gathering data for generating snapshots; capturing snapshots of a target datacenter, each snapshot representing a state of the target datacenter at a respective time, the target datacenter including datacenter components, each snapshot including values of respective parameters of respective datacenter components; comparing snapshots to identify changes in the values occurring between times the respective times of the snapshots; and generating a datacenter representation of the target datacenter, the datacenter representation including, component representations of the datacenter components, and tags in Visual association with respective component representations, each tag indicating a change that occurred between the snapshots being compared to a respective value of a respective parameter for the component represented by the component representation in Visual association with the tag, wherein said tags appear the same on each of said respective component representations, said tags appearing with unique identifiers at each of said respective component representations, said datacenter representation including a topological representation including a representation of nodes and representations of corresponding node connections, said topological representation facilitating recognition by said user of relationships between said nodes, said tags further providing additional identification and explanation of what said tags represent when a user utilizes a user interface to interact with said tags, said tags rendered based on overlay data objects which are separate from said three-level hierarchy topological representation topological data object used to render the topological datacenter image, said overlay data objects providing data for rendering all image objects of a given type, said overlay data objects appearing at different hierarchical levels, said tags configured such that said tags represent data describing changes that occurred within a specific time range, said tags having unique identifiers at a first level, said tags not having unique identifiers at a second level, each of said overlay data objects includes a respective check box that, when checked, indicates that a corresponding one of said overlay data objects is active, said overlay data objects including a top-priority overlay which identifies said nodes with problems requiring immediate attention, wherein the identified differences are assigned to plural difference categories, the process further including changing which categories of identified differences are displayed based on user interactions with difference-category user-interface elements.

9. The system of claim 8 wherein the parameters belong to respective parameter classes, and each of the tags indicates a change that occurred to a respective value of a respective parameter belonging to a parameter class in a first set of parameter classes specified by a user.

10. The system of claim 9 wherein the parameters include configuration problem reports or service reports.

11. The system of claim 9 wherein the parameters include knowledge base items relating to datacenters other than the target datacenter.

12. The system of claim 9 wherein the process further includes responding to interaction with a hierarchical-level control to change the hierarchical level of a representation of the datacenter.

13. The system of claim 9 wherein the process further includes responding to an interaction with a control to select which parameter classes are specified by the user.

14. The system of claim 9 wherein the process further includes interacting with a snapshot control for selecting which snapshots are to be used to generate the overlays.

15. A system comprising non-transitory media encoded with code that, when executed using hardware, causes to be implemented a process including:
  generating a first snapshot of a datacenter descriptive of a state of the datacenter at a first time;
  generating a second snapshot of the datacenter descriptive of a state of the datacenter at a second time;
  identifying differences between the first and second snapshots; displaying component representations of components of the datacenter, said component representations including a topological representation including a representation of nodes and representations of corresponding node connections, said topological representation facilitating recognition by said user of relationships between said nodes; and
  tagging at least one of the component representations with a tag representing at least one of the identified differences between the first and second snapshots, wherein said tag appears the same on each of said respective component representations, said tag appearing with unique identifiers at each of said respective component representations, said tag further providing additional identification and explanation of what said tag represents when a user utilizes a user interface to interact with said tag, said tag rendered based on overlay data objects which are separate from said three-level hierarchy topological representation topological data object used to render the topological datacenter image, said overlay data objects providing data for rendering all image objects of a given type, said overlay data objects appearing at different hierarchical levels, said tags configured such that said tags represent data describing changes that occurred within a specific time range, said tags having unique identifiers at a first level, said tags not having unique identifiers at a second level, each of said overlay data objects includes a respective c heck box that, when checked, indicates that a corresponding one of said overlay data objects is active, said overlay data objects including a top-priority overlay which identifies said nodes with problems requiring immediate attention, wherein the identified differences are assigned to plural difference categories, the process further including changing which categories of identified differences are displayed based on user interactions with difference-category user-interface elements.

16. The system of claim 15 wherein the difference-category user-interface elements include a difference-category that, when activated, cause instances of a respective category of identified difference to be added to the display.

17. The system of claim 15 wherein the process further includes, in response to a hovering over an instance of a difference-category user interface element, displaying a textual description of the difference represented by the user-interface element.

18. The system of claim 15 wherein the process further includes, in response to an interaction with the display, changing at least one of the snapshots and associated times used to identify differences.

19. The system of claim 15 wherein the difference categories include: a fault/failure category having instances corresponding to failures or faults in a component of the computer system, a problem-report category having instances in which problems have been reported referring to a component of the computer system; a service-report category having instances in which a solution to a problem is reported referring to a component of the computer system; and a configuration-change category having instances in which the configuration of a component has been changed.

20. The system of claim 15 wherein the computer system is hierarchical and in which a user can navigate the user interface to display different levels of the hierarchy, such that, for at least one case, the tags reappear at different displayed levels.

21. The system of claim 20 wherein the tags change in form as the user changes hierarchical levels.

* * * * *